United States Patent Office 2,945,807
Patented July 19, 1960

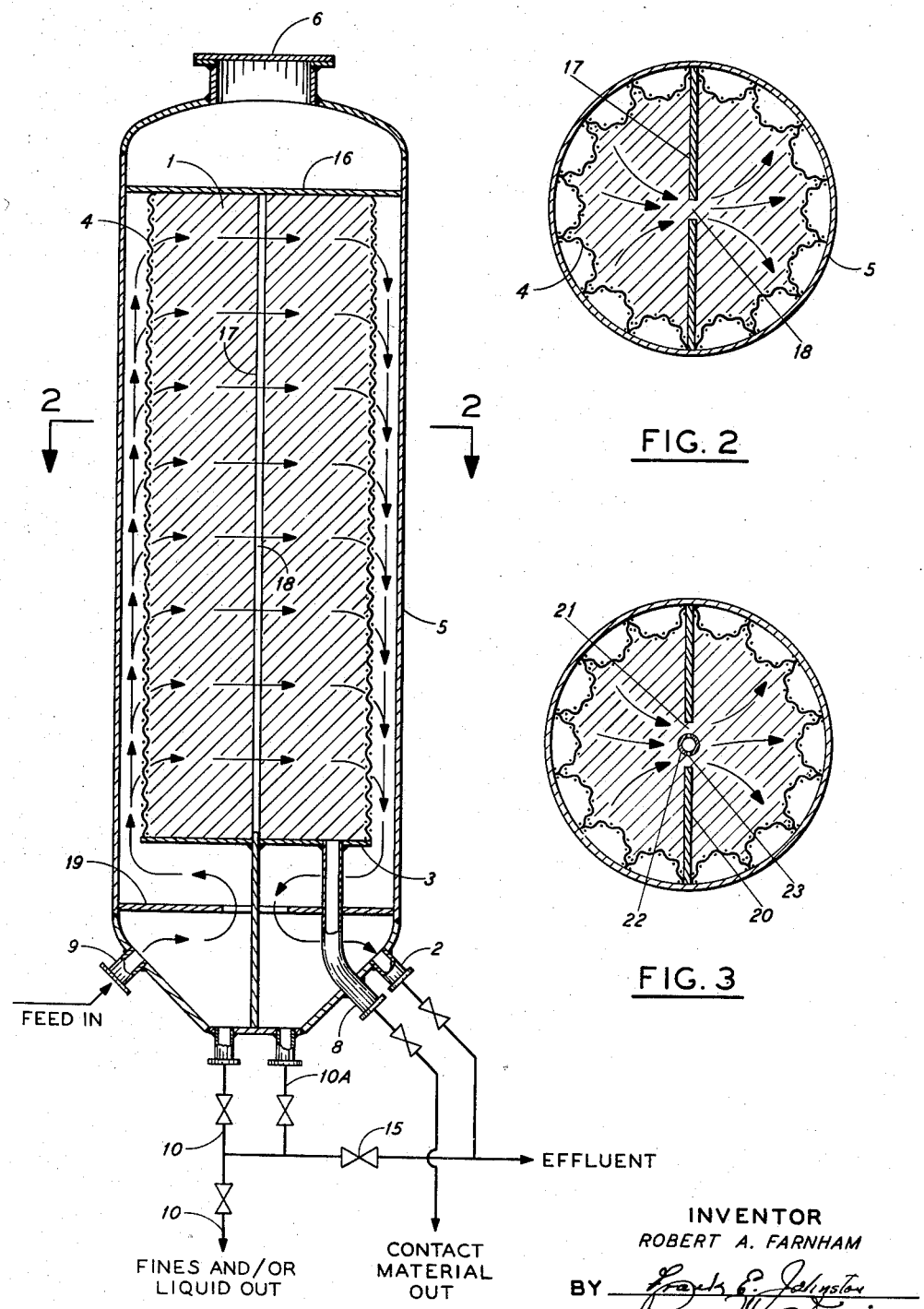

2,945,807

RADIAL FLOW REACTOR

Robert A. Farnham, Novato, Calif., assignor to California Research Corporation, San Francisco, Calif., a corporation of Delaware Filed Sept. 12, 1958, Ser. No. 760,786

7 Claims. (Cl. 208—146)

This invention relates to radial flow reactors, and more particularly to radial flow reactors adapted to hold a fixed bed of subdivided contacting material, for example, catalyst, in a manner permitting radial flow of a reactant stream therethrough.

Conventional fixed bed radial flow reactors, for example, radial flow reactors used in catalytic reforming processes, generally embody a fixed bed of subdivided contact material longitudinally traversed by a perforated centerpipe conduit and surrounded by a retaining screen material having a scalloped appearance when viewed in transverse section. The scalloped retaining screen is surrounded by the reactor housing and the spaces between the scallops and the inner wall of the reactor housing serve as longitudinal fluid flow paths. In such conventional reactors, the inlet for the fluid reactant stream may be located at one end of the reactor housing and a reaction product outlet may be located at the other end of the reactor housing. Alternatively, the feed inlet and the effluent outlet both may be located at the same end of the reactor housing.

In reactors having the inlet and outlet at opposite ends of the housing, the inlet is commonly located at the top of the housing and a cover plate or baffle is situated on top of the catalyst bed beneath the reactant stream inlet to divert the incoming reactant stream into the longitudinal fluid flow spaces between the scallops and the wall of the reactor, from where the stream passes transversely and inwardly through the catalyst bed from all sides thereof, the resulting reaction product stream from the bed passing into the perforated conduit that longitudinally traverses the bed. The longitudinal fluid flow paths between the scallops and the reactor housing must be blocked at the ends thereof that are farthest from the reactant stream inlet and this is commonly accomplished by seating the fixed bed of subdivided material and said scallops on a mass of ceramic balls located in the bottom of the reactor housing.

In reactors having the inlet and outlet at the same end of the housing, the entering stream similarly is diverted around one end of the catalyst bed and into the longitudinal flow spaces between the scallops and the wall of the reactor. From these flow spaces the stream passes transversely and inwardly through the catalyst bed from all sides thereof, the resulting reaction product stream from the bed passing into the perforated conduit that longitudinally traverses the bed.

The foregoing conventional practice is subject to numerous disadvantages. For example, (1) the perforated centerpipe in conventional reactors is expensive to fabricate and requires a good deal of maintenance; (2) in many types of reactors employing perforated centerpipes, it is necessary to remove the centerpipe from the reactor housing when catalyst must be replaced; (3) the centerpipe requires considerable space within the reactor housing, which decreases space available for catalyst; (4) the low pressure drop that necessarily exists with the use of a centerpipe leaves much to be desired in the way of lateral gas distribution through the catalyst bed.

In accordance with the present invention, simple, effective and efficient methods and apparatus are provided for effecting contact between a reactant stream and a subdivided solid contact material, by passing said reactant stream radially through a first vertical sector of a vertically elongated, generally cylindrical, mass of said material from the outside of said sector to about the longitudinal centerline of said mass, thence radially through a second vertical sector of said mass to collecting spaces at the outside of said second sector, and withdrawing reaction products from said collecting spaces. Said first vertical sector desirably will be a hemicylindrical portion of said mass, and said second vertical sector desirably will be the other hemicylindrical portion of said mass.

The novel features of the present invention are set forth with particularity in the appended claims. The invention will best be understood, however, both as to organization and operation, and additional objects and advantages thereof will be apparent, from the following description of a specific embodiment, when read in conjunction with the accompanying drawing, in which: Fig. 1 is a partial sectional view of a reactor constructed in accordance with the present invention; Fig. 2 is a cross-sectional view of the reactor shown in Fig. 1; Fig. 3 is a cross-sectional view of a modification of the reactor shown in Fig. 1.

Referring now to Fig. 1, a fixed bed 1 of subdivided contacting material longitudinally traversed by a vertical plate 17 is supported on a bed plate 3. The sides of the bed of contacting material is supported and retained by screening material 4 having a scalloped appearance when viewed in transverse section. Contacting material bed 1 and screening material 4 are surrounded by reactor housing 5 provided with an access manway cover plate 6. A conduit 8 may be provided for withdrawing subdivided contacting material from bed 1. An inlet 9 is provided in reactor housing 5 for entry of the feed into the reactor. Conduits 10 and 10A may be provided for removing fines from the reactor housing as described hereinafter. Cover plate 16 is provided above catalyst bed 1.

Vertical plate 17 is provided with a vertical slot 18 between plates 16 and 3, said slot being located as shown about on the longitudinal centerline of catalyst bed 1. The portion of vertical plate 17 lying below plate 3 is imperforate. Baffle plates 19 may be provided for a purpose which will be indicated hereinafter.

In the operation of the embodiment illustrated in Fig. 1, for example in a reforming process, a reactant stream is passed into the lower end of reactor housing 5 through inlet 9. This reactant stream may carry particles of rust, scale from furnace tubes and other fines. Suitable baffles 19 may be provided for deflecting incoming fines down to the bottom of reactor housing 5. If desired, valved lines 10 and 10A may be provided as means for fines removal. Valved branch line 15 may be provided if it is desired to have the fines removed through lines 10 and 10A pass into effluent line 2. The reactant stream entering reactor housing 5 through inlet 9 is passed upwardly through the vertical fluid flow paths that are formed by the scalloped edges of retaining screen 4 and the walls of reactor 5 and that are located on the side of the catalyst bed between inlet 9 and vertical plate 17. As the stream passes up the vertical fluid flow paths, additional fines that may be present will separate out and drop to the bottom of reactor housing 5, thus still further reducing the fines concentration in the stream. From the vertical fluid flow paths into which the reactant stream is introduced, the reactant stream is passed radially inward and essentially in a horizontal direction through substantially the entire height of the catalyst bed 1, through vertical slot 18 in vertical plate 17, and thence into the vertical fluid flow paths that are formed by the scalloped edges of retaining screen 4 and the walls of reactor 5, and that are located on the side of the catalyst bed between plate 17 and outlet 2.

Referring now to Fig. 2, there shown is a cross-sectional view of the embodiment of Fig. 1, illustrating plate 17, slot 18, flow paths through catalyst bed 1, and the scalloped configuration of retaining screen 4.

Referring now to Fig. 3, there shown in cross-section is a modification of the embodiment shown in Fig. 1. In this modification a vertical quench distribution pipe 22 containing holes 23 is located in the catalyst bed within slot 21 of plate 20, slot 21 and plate 20 corresponding to slot 18 and plate 17 of the embodiment of Fig. 1. In this modification, as the reactant stream reaches the neighborhood of slot 21 after traversing the first half of the catalyst bed and being partially reacted, quench fluid is released from pipe 22 through holes 23 into the partially reacted stream. Those skilled in the art will recognize the utility of such a quench, particularly in providing heat control and improving product distribution.

From the foregoing, those skilled in the art will recognize that the numerous advantages of the process and apparatus of the present invention include reduced reactor size through elimination of the conventional radial flow reactor centerpipe, elimination of the need for an expensive perforated centerpipe and the associated expensive upkeep thereof, and elimination of the need for centerpipe removal when removing catalyst. Further, the reactor of the present invention can be designed for greater pressure drop through the catalyst bed than can a conventional centerpipe reactor, thus resulting in better lateral distribution of the reactant stream in the catalyst bed.

The methods and apparatus of the present invention may be used to particular advantage in catalytic hydrocarbon conversion operations such as dehydrogenation, reforming, hydroforming, hydrocracking, hydrogenation, etc.

The methods and apparatus of the present invention will be ideally suited to the use of a gaseous feed, from which fines may be efficiently detrained prior to contact between the gas and the bed of contacting material. However, the methods and apparatus of the invention also are applicable to a mixed phase feed comprising gases and liquids. In such case liquids condensing and collecting at the bottom of reactor housing 5 under the prevailing operating conditions may be removed through lines 10 and 10A in the same manner as has been discussed for the removal of fines. Also, in such case it will be apparent that with a number of reactors in series, the feed entering each succeeding reactor generally will tend to contain less and less liquid.

Although only specific arrangements and modes of construction and operation of the present invention have been described and illustrated, numerous changes could be made in those arrangements and modes without departing from the spirit of the invention. All such changes that fall within the scope of the appended claims are intended to be embraced thereby.

What is claimed is:

1. The method of effecting contact between a reactant stream and a subdivided solid contact material, which comprises passing substantially all of said reactant stream through a first vertical sector of a vertically elongated, generally cylindrical, mass of said material from the outside of said sector radially inwardly to about the longitudinal centerline of said mass, thence radially outwardly through a second vertical sector of said mass to collecting spaces at the outside of said second sector, and withdrawing reaction products from said collecting spaces.

2. The method as in claim 1, with the additional step of releasing a quench fluid into said stream as said stream passes near said longitudinal centerline.

3. The method of effecting contact between a reactant stream and a subdivided solid contact material, which comprises passing substantially all of said reactant stream radially inwardly into the center of a vertically elongated, generally cylindrical, mass of said material from the outside of one hemicylindrical portion thereof to about the longitudinal centerline thereof, thence radially outwardly through the other hemicylindrical portion thereof to collecting spaces at the outside of said other hemicylindrical portion, and withdrawing reaction products from said collecting spaces.

4. The method as in claim 3, with the additional step of releasing a quench fluid into said stream as said stream passes near said longitudinal centerline.

5. In the operation of a vertical elongated radial flow reactor wherein contact is effected between a reactant stream and a vertical elongated solid bed of particulate material surrounded by a reactor housing, by passing said stream from spaces between said housing and said bed radially into said bed and withdrawing reaction products from said bed, the improvement which comprises introducing said stream into inlet longitudinal spaces located between said housing and said bed along a first side of said bed only, passing substantially all of said stream from said inlet spaces radially into said bed, thence through a narrow, elongated vertical slot in a vertical plate traversing said bed and separating said bed into two vertical portions, said slot being located about on the longitudinal axis of said bed, thence radially and outwardly through said bed into outlet longitudinal spaces located between said housing and said bed along a second side of said bed, said stream on arriving at said outlet spaces comprising reaction products, and withdrawing reaction products from said outlet spaces.

6. The method as in claim 5, with the additional step of introducing a quench stream of fluid into said reactant stream as it passes through said slot.

7. A reactor constructed to hold a vertically elongated bed of particulate contact material, comprising perforated bed-containing means surrounding the vertical sides of said bed, a vertical elongated reactor housing surrounding said bed and perforate means and forming with the sides of said bed vertical fluid passageways, vertical plate means extending from one side of said housing through the longitudinal axis of said bed to the other side of said housing and dividing said bed into two vertical portions and preventing communication between said vertical portions except through a narrow, elongated vertical slot in said plate means, said vertical slot located on the longitudinal axis of said bed and containing a vertical perforated pipe, means for passing quench fluid into said pipe and out of the perforations therein, said plate means also preventing communication between said vertical fluid passageways on either side of said plate means except through said vertical slot, means for passing a feed stream into the vertical fluid passageways on one side of said plate means and thence radially into said bed, through said vertical slot, outwardly through said bed, and as a reaction product-containing stream into the vertical passageways on the other side of said plate, and means for withdrawing reaction products from said last-named vertical passageways.

References Cited in the file of this patent

UNITED STATES PATENTS

| 2,252,719 | McCausland | Aug. 19, 1941 |
| 2,329,847 | McCausland | Sept. 21, 1943 |
| 2,722,501 | Kassel | Nov. 1, 1955 |

FOREIGN PATENTS

| 555,787 | Great Britain | Sept. 8, 1943 |
| 202,191 | Australia | June 19, 1956 |